(No Model.)

D. R. PORTER.
HORSESHOE GUARD.

No. 589,095.  Patented Aug. 31, 1897.

WITNESSES:
A. D. Harrison.
P. W. Pezzetti.

INVENTOR:
D. R. Porter
by Wright Brown & Quinby
Attys.

UNITED STATES PATENT OFFICE.

DANIEL R. PORTER, OF CHELSEA, MASSACHUSETTS.

HORSESHOE-GUARD.

SPECIFICATION forming part of Letters Patent No. 589,095, dated August 31, 1897.

Application filed December 7, 1896. Serial No. 614,858. (No model.)

*To all whom it may concern:*

Be it known that I, DANIEL R. PORTER, of Chelsea, in the county of Suffolk and State of Massachusetts, have invented certain new and useful Improvements in Horseshoe-Guards, of which the following is a specification.

This invention has for its object to provide an improved guard adapted to be secured to a horse's hoof by the usual shoe and its nails for the purpose of protecting the frog portion of the hoof.

The invention consists in a guard comprising a leather pad inserted between the shoe and the hoof and a downwardly-projecting elastic boss affixed to the under side of the pad in such position as to protect the tender portion of the hoof known as the "frog."

Figure 1:
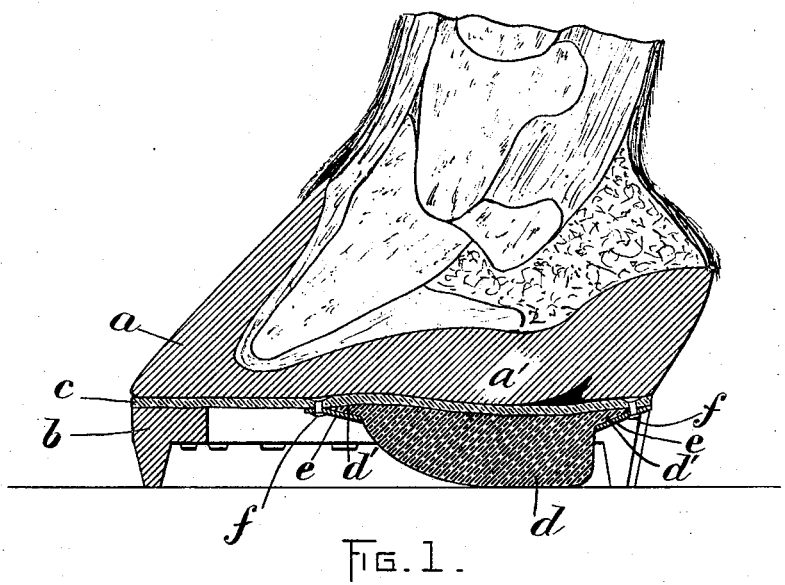
Figure 2:
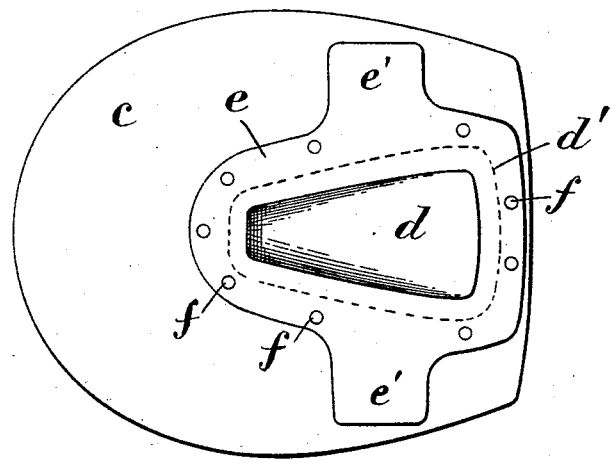

Of the accompanying drawings, forming part of this specification, Figure 1 is a vertical section through the hoof and shoe, showing my improved guard in position. Fig. 2 is a plan view of the guard, looking from beneath.

In the drawings, $a$ represents the horse's hoof, and $b$ the ordinary shoe attached thereto.

$c$ represents a leather pad the front and side marginal portions of which are interposed between the shoe and the edges of the hoof, said pad being retained in place by the nails which fasten the shoe to the hoof.

$d$ represents an elastic boss secured to the pad $c$ in position to guard or protect the frog portion $a'$ of the hoof, said boss being of yielding rubber and constituting a cushion or buffer which protects the pad from injury by contact with stones and other projections with which it would otherwise be liable to come in contact. The said boss $d$ is provided with a flange $d'$ at its upper portion, said flange being confined by a metallic fastening-frame $e$, which is secured to the pad $c$ by rivets $f\,f$ and clamps the boss $d$ to said pad. The fastening-strip $e$ may be provided with ears $e'\,e'$ for the sake of extra stability, said ears being formed to project between the hoof and shoe and prevent the frame $e$ from tipping loosely. The frame $e$ also serves as a guard around the boss to prevent injury to the frog by nails, &c.

I claim—

A horseshoe-guard comprising a flexible pad, a flanged rubber boss thereon, and a metallic fastening-frame riveted to the pad and engaged with the flange of the boss.

In testimony whereof I have signed my name to this specification, in the presence of two subscribing witnesses, this 4th day of December, A. D. 1896.

DANIEL R. PORTER.

Witnesses:
C. F. BROWN,
A. D. HARRISON.